US012748683B2

(12) United States Patent
Yogesha et al.

(10) Patent No.: US 12,748,683 B2
(45) Date of Patent: Sep. 29, 2026

(54) LARGE LANGUAGE MODEL ANALYSIS AND GROUPING OF SOFTWARE REQUIREMENTS TO GENERATE TEST CASES FOR SOFTWARE TESTING

(71) Applicant: Honeywell International Inc., Charlotte, NC (US)

(72) Inventors: Aralakuppe Ramegowda Yogesha, Bangalore (IN); Jayakumar S S, Bangalore (IN); Srikanth Nagaraj, Bangalore (IN); Pradeep Sadananda, Bangalore (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 248 days.

(21) Appl. No.: 18/604,000

(22) Filed: Mar. 13, 2024

(65) Prior Publication Data

US 2025/0238352 A1 Jul. 24, 2025

(30) Foreign Application Priority Data

Jan. 22, 2024 (IN) ............................ 202411004302

(51) Int. Cl.

*G06F 11/3668* (2025.01)
*G06F 8/10* (2018.01)
*G06F 40/20* (2020.01)

(52) U.S. Cl.

CPC ............ *G06F 11/3688* (2013.01); *G06F 8/10* (2013.01); *G06F 40/20* (2020.01)

(58) Field of Classification Search

CPC ......... G06F 11/3688; G06F 8/10; G06F 40/20

(Continued)

(56) References Cited

U.S. PATENT DOCUMENTS 6,698,012 B1 * 2/2004 Kossatchev ......... G06F 11/3684 717/124
8,108,745 B2 1/2012 Kikta et al.
(Continued)

FOREIGN PATENT DOCUMENTS

CN 108415838 B 7/2021
CN 113448843 A 9/2021
(Continued)

OTHER PUBLICATIONS

European Patent Office, "Extended European Search Report", dated Jun. 27, 2025, from EP Application No. 25151744.7, from Foreign Counterpart to U.S. Appl. No. 18/604,000, pp. 1 through 10, Published: EP.

(Continued)

*Primary Examiner* — Wei Y Mui
*Assistant Examiner* — Amir Soltanzadeh
(74) *Attorney, Agent, or Firm* — Fogg & Powers LLC

(57) ABSTRACT

A system includes processor(s) configured to: receive natural language text describing software requirements for software program; analyze natural language text describing software requirements to identify relationships between different software requirements at least in part by: analyzing how data flows between different software requirements; analyzing how different software requirements influence path and decision points to achieve functionality identified by software requirements; and identifying dependencies between different software requirements; establish sequence for different software requirements based on relationships identified between different software requirements; group plurality of different software requirements together into logical group(s) of software requirements based on sequence for different software requirements and relationships between different software requirements; generate test cases (Continued)

based on logical group(s) of software requirements; execute software program using test cases; and analyze results of execution of software program using test cases to identify any defects in software program.

11 Claims, 4 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 8,924,938 | B2 * | 12/2014 | Chang ................. | G06F 11/3688 717/126 |
| 2017/0199810 | A1 * | 7/2017 | Hamilton, II ....... | G06F 11/3684 |
| 2022/0091968 | A1 * | 3/2022 | Kumar ................ | G06F 11/3698 |
| 2023/0096325 | A1 * | 3/2023 | Bahrami .............. | G06N 3/0464 717/137 |
| 2024/0241816 | A1 * | 7/2024 | Kambadahalli Gangappa ............ | G06F 11/3688 |

FOREIGN PATENT DOCUMENTS

| | | |
|---|---|---|
| CN | 110347603 B | 8/2023 |
| IN | 565KOL2015 | 8/2017 |
| IN | 202311027481 | 2/2023 |

OTHER PUBLICATIONS

Wang et al. "Software Testing with Large Language Model: Survey, Landscape, and Vision", arXiv: 2307.07221v1, Jul. 14, 2023, pp. 1 through 20.

Dees, "MPC553x, MPC555x, and MPC556x Family Nexus Interface Connector MICTOR-38, Robust, and JTAG Connector Definitions", Freescale Semiconductor Application Note, Document No. AN2614, Rev, D, Mar. 18, 2010, pp. 1 through 22.

Wikipedia, "Nexus (standard)", as downloaded Oct. 6, 2023 from https://en.wikipedia.org/wiki/Nexus_(standard), pp. 1 through 3.

* cited by examiner

LARGE LANGUAGE MODEL ANALYSIS AND GROUPING OF SOFTWARE REQUIREMENTS TO GENERATE TEST CASES FOR SOFTWARE TESTING

BACKGROUND

Software testing is important to software development, particularly when software could have many software requirements.

SUMMARY

A system includes at least one processor and at least one memory communicatively coupled to the at least one processor, the at last one processor configured to: (A) receive natural language text describing software requirements for a software program; (B) analyze the natural language text describing the software requirements to identify relationships between a plurality of different software requirements of the software requirements at least in part by: (1) analyzing how data flows between the plurality of different software requirements; (2) analyzing how the plurality of different software requirements influence path and decision points to achieve functionality identified by the software requirements; and (3) identifying dependencies between the plurality of different software requirements; (C) establish a sequence for the plurality of different software requirements based on the relationships identified between the plurality of different software requirements of the software requirements; (D) group the plurality of different software requirements together into at least one logical group of software requirements based on the sequence for the plurality of different software requirements of the software requirements and the relationships between the plurality of different software requirements; (E) generate test cases based on the at least one logical group of software requirements; (F) execute the software program using the test cases; and (G) analyze results of execution of the software program using the test cases to identify any defects in the software program.

A method comprises: (A) receiving natural language text describing software requirements for a software program; (B) analyzing natural language text describing the software requirements to identify relationships between a plurality of different software requirements of the software requirements at least in part by: (1) analyzing how data flows between the plurality of different software requirements; (2) analyzing how the plurality of different software requirements influence path and decision points to achieve functionality identified by the software requirements; and (3) identifying dependencies between the plurality of different software requirements; (C) establishing a sequence for the plurality of different software requirements based on the relationships identified between the plurality of different software requirements of the software requirements; (D) grouping the plurality of different software requirements together into at least one logical group of software requirements based on the sequence for the plurality of different software requirements of the software requirements and the relationships between the plurality of different software requirements; (E) generating test cases based on the at least one logical group of software requirements; (F) executing the software program using the test cases; and (H) analyzing results of execution of the software program using the test cases to identify any defects in the software program.

A non-transitory computer-readable medium including a set of instructions that, when executed by at least one processor, cause the at least one processor to: (A) receive natural language text describing software requirements for a software program; (B) analyze the natural language text describing the software requirements to identify relationships between a plurality of different software requirements of the software requirements at least in part by: (1) analyzing how data flows between the plurality of different software requirements; (2) analyzing how the plurality of different software requirements influence path and decision points to achieve functionality identified by the software requirements; and (3) identifying dependencies between the plurality of different software requirements; (C) establish a sequence for the plurality of different software requirements based on the relationships identified between the plurality of different software requirements of the software requirements; (D) group the plurality of different software requirements together into at least one logical group of software requirements based on the sequence for the plurality of different software requirements of the software requirements and the relationships between the plurality of different software requirements; (E) generate test cases based on the at least one logical group of software requirements; (F) execute the software program using the test cases; and (G) analyze results of execution of the software program using the test cases to identify any defects in the software program.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
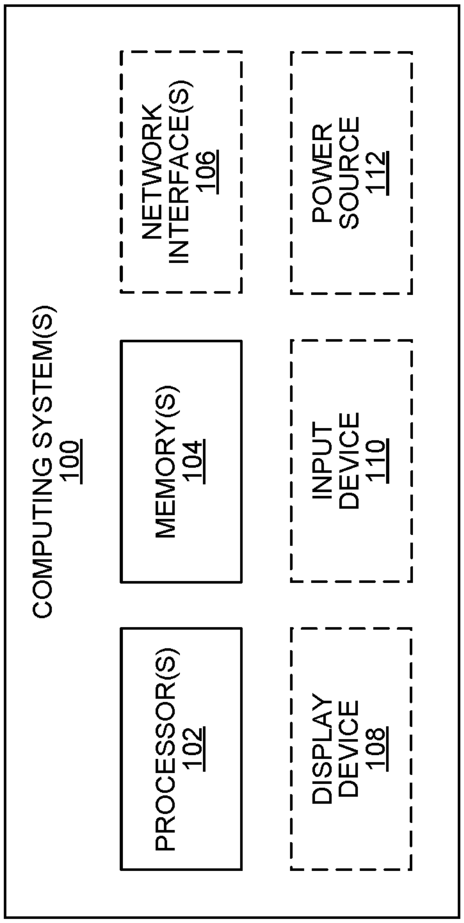
FIG. 1 is a block diagram illustrating example computing system(s).

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In examples of software testing, software has to go through certifications where it is required to prove that sufficient testing has been done on the software. In examples, a test and results needs to be documented for each software requirements to confirm that the software meets the intended requirements. Software testing methods can involve a great deal of manual work and often require a separate test to be developed for each individual requirement or functionality. Software testing methods are often inefficient and ineffective, particularly when separate tests are developed for individual software requirements. Software testing methods can require a large number of tests to be run, which can be time-consuming and expensive. Additionally, software testing methods often do not test the software in a way that is representative of how it will be used in the real world and can also miss certain edge cases or complex interactions between different parts of the software. This can lead to defects that are not found until the software is released to users, which can be costly and disruptive. In some software testing, each requirement or system component is tested independently. This approach of testing in isolation, although thorough, has several inefficiencies and is not wholly representative of real-world use cases. This lack of cohesiveness can lead to significant gaps in the testing process. For instance, in complex systems, numerous system requirements are interdependent and sequential in nature, meaning data produced by one requirement often goes as an input to another requirement.

An example system could include system initialization requirements that initialize the system to initial valid values, requirements for putting the system in a fault-free state, then requirements to put the system in an Initiated Built-in test Mode. This sequence also involves built-in test detection, built-in test validation, fault logging, and fault transmission requirements. Each of these requirements is interrelated, and the outcome of one requirement is a pre-condition for another requirement. Testing each of these requirements separately can lead to inefficiencies and increased redundancy, as the same states or data points might need to be regenerated multiple times. Additionally, isolated testing does not fully represent actual scenarios, hence reducing the overall effectiveness of testing in identifying potential problems.

In examples, identifying the right user scenarios aids in effective software design and development, offering insights into user needs and behaviors. In examples, these user scenarios provide context for features, ensuring seamless integration into users' workflows. In examples, user scenarios guide text case design, aligning testing with real-world usage and addressing critical functionalities and potential edge cases. In examples, user scenarios translate user needs into actionable development tasks and foster a systematic approach to software development. In examples, user scenarios are a logically grouping of interdependent requirements related to given user interaction to achieve specific tasks. In example systems and/or methods, all of the user scenarios can be identified.

To address these challenges, software testing can be made more efficient and optimized by using generative artificial intelligence (AI) large language models (LLMs) to logically group software requirements that are interrelated and sequential in nature. In examples, the LLM may include the GPT-3 LLM or any other suitable LLM. LLMs are trained on massive datasets of text and code, which gives them the ability to understand the relationships between different software requirements. This understanding can be used to logically group requirements together and to generate test cases that are more efficient and effective. Instead of testing each requirement in isolation, requirements would be grouped logically based on their interdependencies and sequences, thereby enabling scenario-based end-to-end testing. This approach not only reduces the total number of tests to be conducted but also enhances the comprehensiveness of the testing process. It helps recreate scenarios closer to real-world conditions, thereby increasing the likelihood of identifying potential issues that could arise in actual use cases.

Large language model(s) can be used to analyze requirements; identify the interrelations, dependencies, and/or sequences among the system requirements; and interpret the actual meaning of each word of every requirement; and recommend the grouping of related requirements and the sequence of requirements for execution. Requirements can be grouped into logical units, where each group represents a particular scenario or state of a control system. The testing is then conducted on these groups, thereby ensuring that each requirement is tested in conjunction with other related requirements. This logical grouping of requirements improves the efficiency and effectiveness of software testing because it ensures that the software is tested under conditions that closely resemble its real-world operating conditions. In this approach, the outcome of one requirement becomes the precondition for another, which enhances the overall flow of testing and reduces redundancies. This method of testing is more effective and efficient, as it eliminates the need for creating and recreating multiple individual test environments and test data for each requirement.

In examples, the use of LLMs can help to improve the efficiency and effectiveness of software testing. First, LLMs can help to reduce the number of test cases that need to be generated because the LLMs can identify the logical relationships between different requirements, which allows them to generate test cases that cover all of the possible interactions between the requirements. Second, LLMs can help to improve the effectiveness of testing by identifying potential defects that might not be found by traditional testing methods. In examples, this is because LLMs can understand the relationships between different requirements, which allow the LLMs to identify potential defects that might occur when different requirements interact with each other. By improving the efficiency and effectiveness of software testing, LLMs can help to reduce the time and cost of software development while also improving the quality of the software that is produced.

In examples, the software requirements can be grouped together into logical sequences, such as the sequence of events that occurs when the system is initialized. LLMs can be used to identify these sequences and to generate test cases that cover all of the possible interactions between the requirements. This can help to ensure that the software is tested in a way that is representative of how it will be used in the real world. In addition to improving the efficiency of software testing, LLMs can also help to improve the effectiveness of testing. By understanding the relationships between different requirements, LLMs can identify potential defects that might not be found by traditional testing methods. This can help to ensure that software is released with a higher degree of quality.

Once the requirements have been grouped together into logical sequences, test cases can be generated for each sequence. In examples, the test cases can then be run on the software to ensure that the software is functioning as expected. Logically grouping software requirements together and generating test cases that are more efficient using LLMs can help to reduce the time and cost of software testing. By understanding the relationships between different software requirements, LLMs can help to identify potential defects that might not be found by traditional testing methods. By ensuring that software is tested in a way that is representative of how it will be used in the real world using LLMs to generate the tests can help to improve the quality of software.

FIG. 1 is a block diagram illustrating example computing system(s) 100. The computing system(s) 100 includes at least one processor 102, at least one memory 104, optional at least one network interface 106, optional display device 108, optional input device 110, and optional power source 112.

In examples, the at least one memory 104 can be any device, mechanism, or populated data structure used for storing information. In examples, the at least one memory 104 can be or include any type of volatile memory, non-volatile memory, and/or dynamic memory. In examples, the at least one memory 104 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

The at least one processor 102 can be any known processor, such as a general purpose processor (GPP) or special purpose (such as a field-programmable gate array (FPGA), application-specific integrated circuit (ASIC) or other integrated circuit or circuitry), any programmable logic device, or any circuitry. In examples, any of the functionality disclosed herein may be implemented by the at least one processor 102 and the at least one memory 104.

In accordance with some embodiments, the at least one memory 104 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 104. The at least one memory 104 may be used to store instructions for running one or more applications or modules on the at least one processor 102. In examples, the at least one memory 104 could be used in one or more examples to house all or some of the instructions needed to execute the functionality discussed herein.

In examples, the at least one optional network interface 106 includes or is coupled to at least one optional antenna for communication with a network. In examples, the at least one optional network interface 106 includes at least one of an Ethernet interface, a cellular radio access technology (RAT) radio, a Wi-Fi radio, a Bluetooth radio, or a near field communication (NFC) radio. In examples, the at least one optional network interface 106 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 106 includes a Wi-Fi (IEEE 802.11) radio configured to communicate with a wireless local area network that communicates with the remote server, rather than a wide area network. In examples, the at least one optional network interface 106 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 108 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 110 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 108 is combined with the optional at least one input device 110 into a human machine interface (HMI) for user interaction with the system(s) 100. In examples, at least one optional power source 112 is used to provide power to the various components of the computing system(s) 100.

Figure 2:
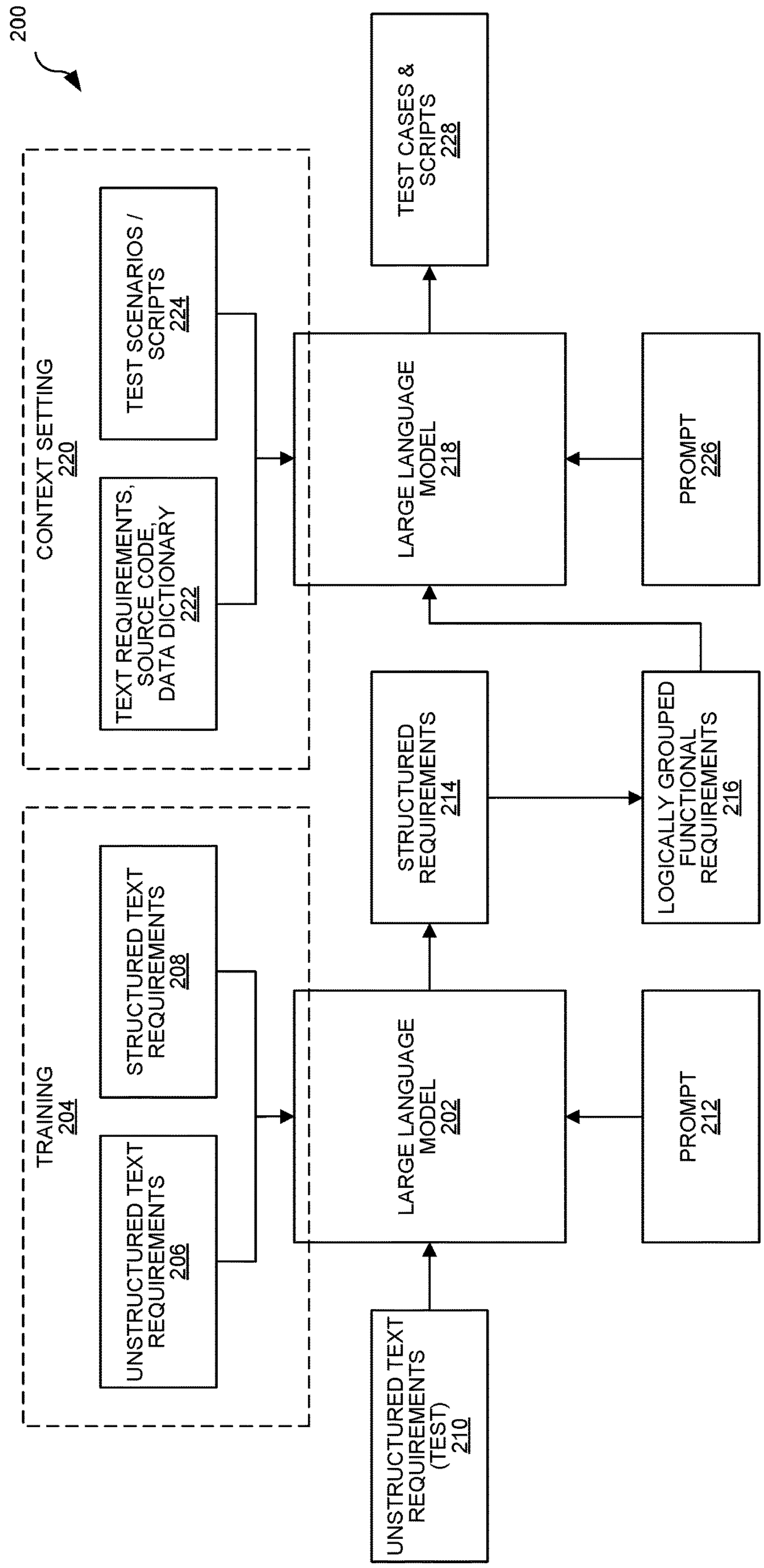
FIG. 2 is a block diagram showing functional components of a system.

FIG. 2 is a block diagram showing functional components of a system 200. In examples, any of the functional components of the system 200 can be implemented using any of the physical components and/or circuitry of example computing system(s) 100 described above. In examples, the system 200 includes a large language model (LLM) 202. In examples, the LLM 202 undergoes training 204 using unstructured text requirements 206 and structured text requirements 208. In examples, unstructured text requirements 206 are written in natural language while structure text requirements 208 are written in a specific format. In examples, generating tests from structured text requirements 208 is substantially easier than generating tests directly from unstructured text requirements 206.

During operation, unstructured text requirements 210 are provided to the LLM 202 with a prompt 212. In examples, the LLM 202 processes the unstructured text requirements 210 based on the prompt 212 and outputs structured requirements 214. In examples, the structured requirements 214 are logically grouped into logically grouped functional requirements 216.

In examples, the system 200 includes a large language model (LLM) 218. In examples, the LLM 218 is the same LLM as LLM 202. In examples, the LLM 218 is a different LLM from LLM 202. In examples, the LLM 218 undergoes context setting 220 using text requirements, source code, and/or a data dictionary 222 and test scenarios/scripts 224 to improve the ability of the LLM 218 to generate text cases and scripts based on input functional requirements. During operation, the logically grouped functional requirements 216 are provided to the LLM 218 with a prompt 226. In examples, the LLM 218 process the logically grouped functional requirements 216 based on the prompt 226 and outputs test cases & scripts 228.

Figure 3:
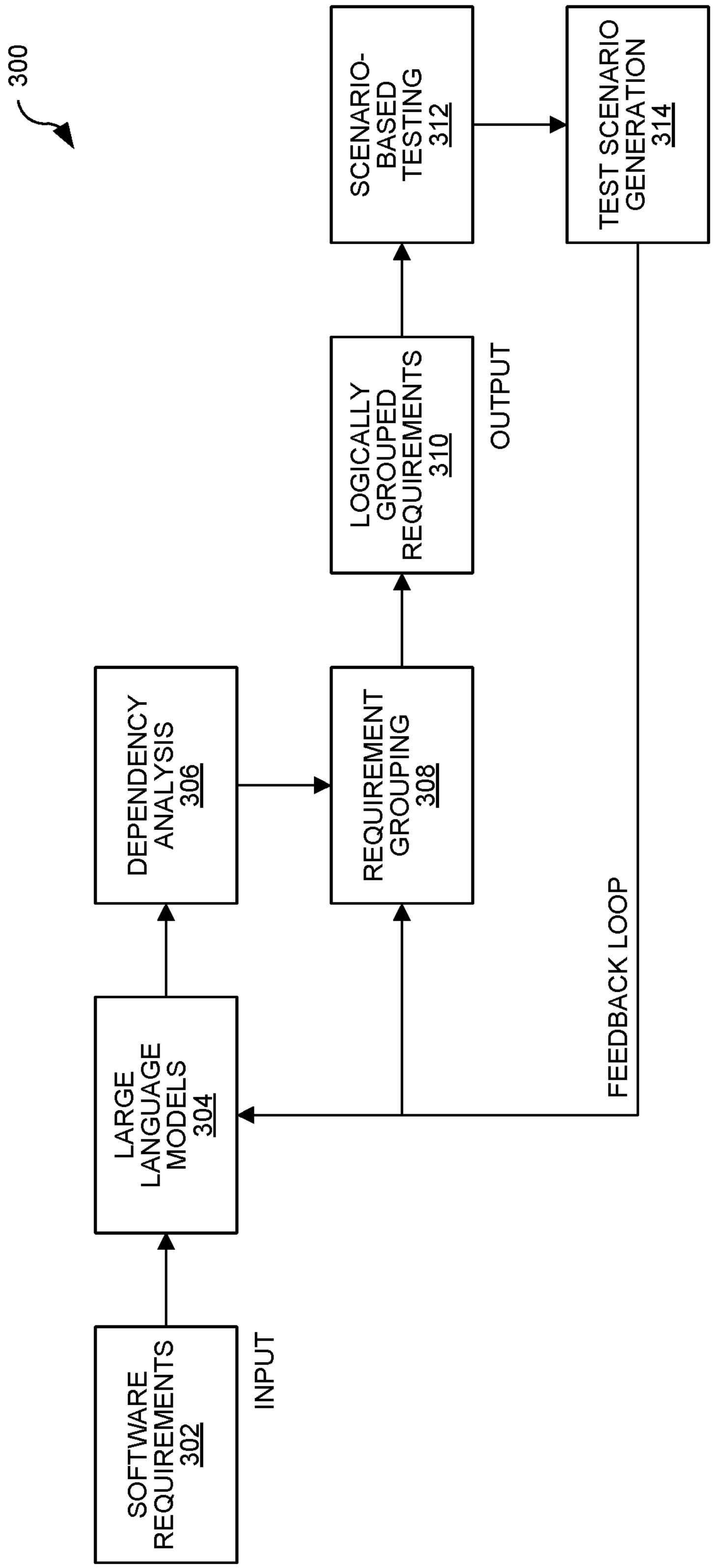
FIG. 3 is a block diagram showing functional components of a system.

FIG. 3 is a block diagram showing functional components of a system 300. In examples, any of the functional components of the system 300 can be implemented using any of the physical components and/or circuitry of example computing system(s) 100 described above. In examples, the system 300 includes software requirements 302 as an input into large language model(s) 304. In examples, the software requirements 302 represent the set of software requirements that need to be tested and to be grouped before testing. In examples, the software requirements 302 for the system are fed into the process. In examples, the software requirements 302 could be in the form of software requirements documents or user stories, use cases, system requirement specification documents, etc. In a specific example, the software requirements 302 could be for a system where periodic built-in tests are performed to monitor the health of the system and take appropriate corrective action if a fault is detected. In the specific example, all the requirements related to under voltage built-in test performed by the system is considered. The specific example may include the following software requirements: (1) requirement to initialize the system parameters used in an under voltage built-in test on system power up; (2) requirement to put the system into generate control mode, where the under voltage built-in test is performed; (3) requirement to perform the under voltage built-in test in test fault detection; (4) requirement to perform the under voltage built-in test fault validation; (5) requirement to perform the under voltage built-in test fault logging into a fault log area; and/or (6) requirement to perform the under voltage built-in test fault transmission to external maintenance system.

In examples, the large language model(s) 304 are large language model(s) that are used to logically group the software requirements into interrelated sets that represent specific scenarios or states of the system. In examples, the large language model(s) 304 are used to analyze the software requirements 302. In examples, the large language model(s) 304 read and interpret the software requirements 302 and identify interdependencies, sequences, and relationships between various requirements. In examples, the large language model(s) 304 use knowledge of natural language to analyze the software requirements 302. In examples, the large language model(s) 304 read and interpret the requirements, identifying interdependencies, sequences, and relationships between various requirements. In examples, the large language model(s) 304 group the requirements to create a set of logically grouped requirements that are grouped together based on their dependencies and relationships. In examples, the large language model may group the requirements together based on the following criteria: (1) data and control coupling (the requirements are coupled because the data produced by one requirement is consumed by the next requirement); and (2) sequence (the requirements are sequenced because they must be executed in a specific order). In the specific example, a requirement to (1) initialize the system parameters used in under voltage built-in test on system power up initializes the system parameters that are used by other requirements to (2) perform the under voltage built-in test fault detection. In the specific example, the requirement to (1) perform the under voltage built-in test fault detection set a pre-condition for the requirement to (2) perform the under voltage built-in test fault validation. In the specific example, the requirement to (1) initialize the system parameters used in under voltage built-in test on system power up must be executed before the requirements to (2) perform the under voltage built-in test fault detection. In the specific example, the requirement to (1) perform the under voltage built-in test fault validation is executed before the Requirement to (2) perform the under voltage built-in test fault logging into the fault log area because the fault is logged only after the fault is validated.

In examples, a dependency analysis 306 logically groups the software requirements 302 based on the analysis from the large language model(s) 304. In examples, the dependency analysis 306 identifies the relationships between the software requirements. In examples, the dependency analysis 306 handles the organization of requirements into interrelated sets that represent specific scenarios or states of the system. In examples, the input to the dependency analysis 306 is the set of logically grouped requirements from the large language model(s) 304. In examples, the dependency analysis 306 organizes the logically grouped requirements into interrelated sets that represent specific scenarios or states of the system. In examples, this is done by identifying the dependencies between the requirements. In examples, the dependency analysis 306 is a set of interrelated sets of requirements. In examples, theses sets of requirements represent specific scenarios or states of the system. In the specific example, the dependency analysis process would likely identify the following dependencies. First, the requirement to (1) initialize the system parameters used in under voltage built-in test on system power up depends on the requirement to (2) put system into generate control mode because the system must be in generate control mode in order to initialize the system parameters. Second, the requirement to (1) perform the under voltage built-in test fault detection depends on the requirement to (2) initialize the system parameters used in under voltage built-in test on system power up because the system parameters must be initialized in order to perform the fault detection. Third, the requirement to (1) perform the under voltage build in test fault validation depends on the requirement to (2) perform the under voltage built-in test fault detection because the fault detection must be performed in order to validate the fault. Fourth, the requirement to (1) perform the under voltage built-in test fault logging into fault log area depends on the requirement to (2) perform the under voltage built-in test fault validation because the fault validation must be performed in order to log the fault. Fifth, the requirement to (1) perform the under voltage built-in test fault transmission to external maintenance system depends on the requirement to (2) perform the under voltage built-in test fault logging into fault log area because the fault logging must be performed in order to transmit the fault to the external maintenance system.

In examples, the requirement grouping 308 groups the set of software requirements logically into logically grouped requirements 310 that represent the set of software requirements that have been grouped together logically. In examples, the input to the requirement grouping 308 is the output of the dependency analysis 306. In examples, the logically grouped requirements block represents the set of software requirements that have been grouped together logically based on their dependencies. In examples, the output of the requirement grouping 308 is the set of logically grouped requirements 310. In examples, these requirements are grouped together based on their dependencies and relationships. In the specific example, the following logically grouped requirements could be identified. First, under voltage built-in test initialization (including the requirements to (1) initialize the system parameters used in under voltage built-in test on system power up and (2) put system into generate control mode). Second, under voltage built-in test fault detection (including the requirements to (1) perform the under voltage built-in test fault detection and (2) perform the under voltage built-in test fault validation). Third, under voltage built-in test fault logging and transmission (including the requirements to (1) perform the under voltage built-in test fault logging into fault log area and (2) perform the under voltage built-in test fault transmission to external maintenance system).

In examples, the logically grouped requirements 310 are then tested as a whole within the established test environment using scenario-based testing 312, as opposed to testing individual requirements in isolation. In examples, this is done by executing the test cases that have been generated for the logically grouped requirements. In examples, this includes running tests, identifying and logging any issues or bugs, and capturing test outcomes. In examples, the input to the scenario-based testing 312 is the set of logically grouped requirements from the logically grouped requirements block. In examples, the scenario-based testing 312 tests the software as a whole, rather than testing individual requirements in isolation. In examples, this done by executing the test cases that have been generated for the logically grouped requirements 310. In examples, the output of the scenario-based testing 312 is a set of test results. In examples, these test results indicate whether the software has passed or failed the tests.

In examples, the test scenario generation 314 includes the set of test cases that have been generated for the logically grouped requirements. In examples, the input to the test scenario generation 314 is the set of logically grouped requirements 310 from the requirement grouping 308. In examples, the test scenario generation 314 generates test cases for the logically grouped requirements 310. In examples, the test cases are generated based on the dependencies between the logically grouped requirements 310. In examples, a test case for the under voltage built-in test initialization group might involve initializing the system parameters and then putting the system into generate control mode. In examples, a test case for the under voltage built-in test fault detection group might involve performing the fault detection and then validating the fault. In examples, a test case for the under voltage built-in test fault logging and transmission group might involve logging the fault and then transmitting the fault to the external maintenance system. In examples, the output of the test scenario generation 314 is a set of test cases designed to test the software for all possible scenarios and states.

In examples, a feedback loop can be provided to the large language model(s) 304 and the requirement grouping 308. In examples, after the requirements have been logically grouped and the groups have been used to perform scenario-based end-to-end testing, the results could be manually (or otherwise) reviewed. In examples, reviewers might check whether the grouping of requirements made logical sense and whether the sequence of operations was correct. In examples, reviewers might collect feedback on any error or inconsistencies. In examples, this feedback is then fed back into the large language model(s) 304 and the requirements grouping 308 implemented using the AI model(s). In examples, the feedback is structured in a way that the large language model(s) 304 and requirements grouping 308 AI model(s) can understand. In examples, it could take the form of adjustments to the original requirement descriptions, additional context or clarification notes, or explicit corrections to the requirement groupings. In examples, the AI model(s) (such as the large language model(s) 304 and requirements grouping 308) is retrained using the corrected requirement groupings as part of its training data. In examples, this allows the AI model(s) to improve from mistakes and adjust understanding of how to group requirements.

Figure 4:
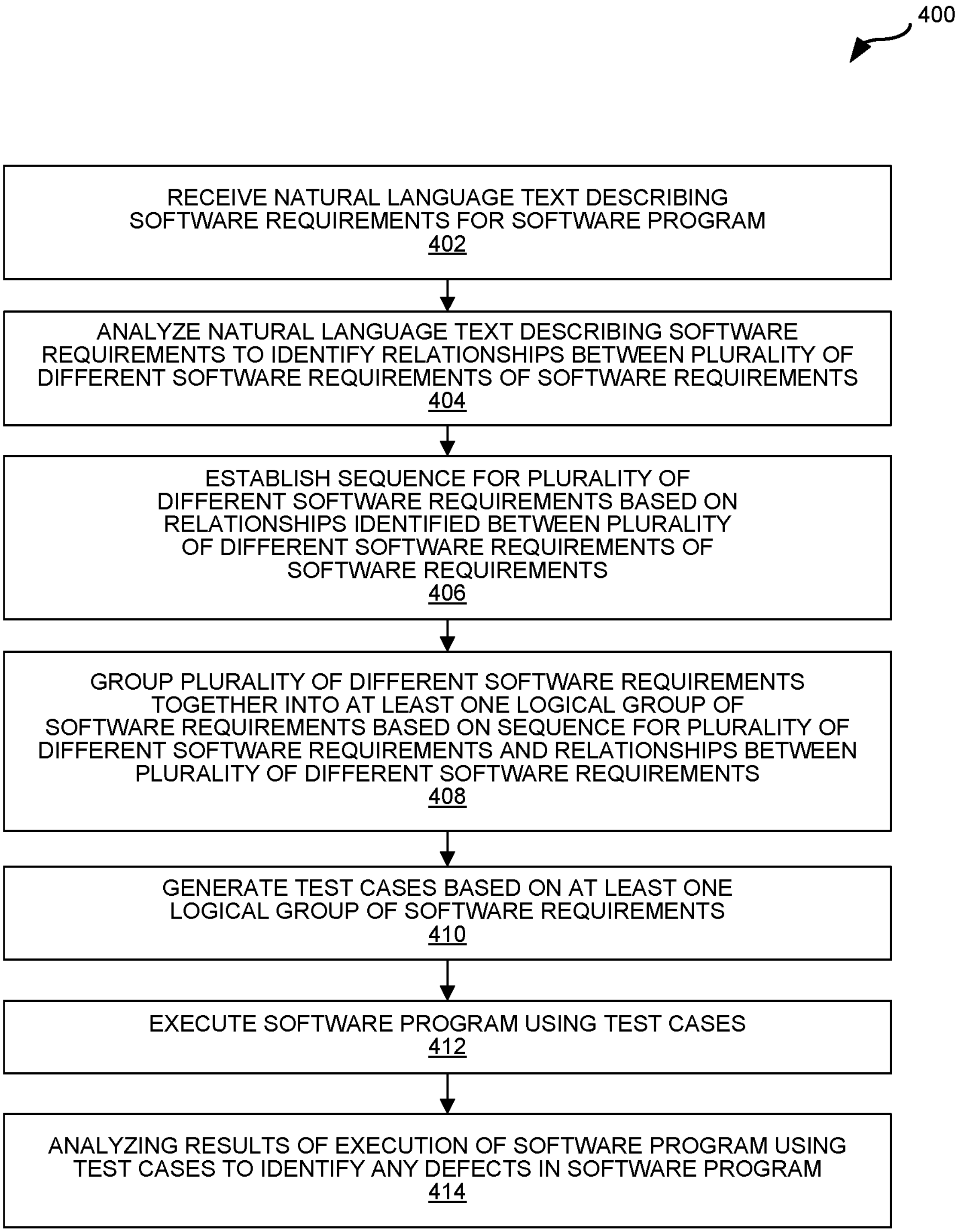
FIG. 4 is an example method for generating test cases for software testing.

FIG. 4 is an example method 400 for generating test cases for software testing. In examples, the example method 400 is executed using any of system 100, system 200, or system 300 described above. In examples, method 400 begins at block 402 with receiving natural language text describing software requirements for a software program. In examples, the natural language text describing the software requirements for the software program are provided to a LLM implemented using AI model(s). In examples, method 400 proceeds to block 404 with analyzing the natural language text describing the software requirements to identify relationships between a plurality of different software requirements of the software requirements. In examples, the analyzing the natural language text describing the software requirements to identify relationships between a plurality of different software requirements of the software requirements includes: (1) analyzing how data flows between the plurality of different software requirements; (2) analyzing how the plurality of different software requirements influence path and decision points to achieve functionality identified by the software requirements; and (3) identifying dependencies between the plurality of different software requirements.

In examples, method 400 proceeds to block 406 with establishing a sequence for the plurality of different software requirements based on relationships identified between the plurality of different software requirements of software requirements. In examples, method 400 proceeds to block 408 with grouping a plurality of different software requirements together into at least one logical group of software requirements based on the sequence for the plurality of different software requirements and relationships between the plurality of different software requirements. In examples, the LLM implementing the AI model(s) is used to perform blocks 404, 406, and 408. In examples, method 400 proceeds to block 410 with generating test cases based on the at least one logical group of software requirements. In examples, method 400 proceeds to block 412 with executing the software program using the test cases. In examples, method 400 proceeds to block 414 with analyzing the results of the execution of the software program using the test cases to identify any defects in the software.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory and storage media, including by way of example random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs), magneto-optical disks, and/or the like. Any of the foregoing may be supplemented by, or incorporated in, any known processor, such as a general purpose processor (GPP) or special purpose (such as a field-programmable gate array (FPGA), application-specific integrated circuit (ASIC) or other integrated circuit or circuitry), or any programmable logic device.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a system, comprising: at least one processor; at least one memory communicatively coupled to the at least one processor; and wherein the at least one processor is configured to: receive natural language text describing software requirements for a software program; analyze the natural language text describing the software requirements to identify relationships between a plurality of different software requirements of the software requirements at least in part by: analyzing how data flows between the plurality of different software requirements; analyzing how the plurality of different software requirements influence path and decision points to achieve functionality identified by the software requirements; and identifying dependencies between the plurality of different software requirements; establish a sequence for the plurality of different software requirements based on the relationships identified between the plurality of different software requirements of the software requirements; group the plurality of different software requirements together into at least one logical group of software requirements based on the sequence for the plurality of different software requirements of the software requirements and the relationships between the plurality of different software requirements; generate test cases based on the at least one logical group of software requirements; execute the software program using the test cases; and analyze results of execution of the software program using the test cases to identify any defects in the software program.

Example 2 includes the system of Example 1, wherein the at least one processor is configured to analyze the natural language text describing the software requirements to identify the relationships between the plurality of different software requirements of the software requirements at least in part by: generating structured text requirements from unstructured text requirements before analyzing how the data flows between the plurality of different software requirements.

Example 3 includes the system of Example 2, wherein generating the structured text requirements from the unstructured text requirements occurs at least in part using a large language model with the unstructured text requirements as input.

Example 4 includes the system of Example 3, wherein the large language model was trained with a set of training unstructured text requirements and corresponding training structured text requirements.

Example 5 includes the system of any of Examples 1-4, wherein the at least one processor is configure to analyze the natural language text describing the software requirements to identify the relationships between the plurality of different software requirements of the software requirements at least in part by: generating structured text requirements from unstructured text requirements before analyzing how the data flows between the plurality of different software requirements; analyzing how the data flows between the plurality of different software requirements by comparing inputs and outputs of the structured text requirements; and identifying the dependencies between the plurality of different software requirements by comparing the inputs and the outputs of the structured text requirements.

Example 6 includes the system of any of Examples 1-5, wherein the at least one processor is configured to generate the test cases based on the at least one logical group of software requirements at least in part using a large language model with the at least one logical group of software requirements as an input.

Example 7 includes the system of any of Examples 1-6, wherein the at least one processor is further configured to: use feedback from the results of the execution of the software program using the test cases to better: (1) analyze the natural language text describing the software requirements to identify the relationships between the plurality of different software requirements of the software requirements; (2) establish the sequence for the plurality of different software requirements based on the relationships identified between the plurality of different software requirements of the software requirements; and (3) group the plurality of different software requirements together into the at least one logical group of software requirements based on the sequence for the plurality of different software requirements of the software requirements and the relationships between the plurality of different software requirements.

Example 8 includes a method, comprising: receiving natural language text describing software requirements for a software program; analyzing the natural language text describing the software requirements to identify relationships between a plurality of different software requirements of the software requirements at least in part by: analyzing how data flows between the plurality of different software requirements; analyzing how the plurality of different software requirements influence path and decision points to achieve functionality identified by the software requirements; and identifying dependencies between the plurality of different software requirements; establishing a sequence for the plurality of different software requirements based on the relationships identified between the plurality of different software requirements of the software requirements; grouping the plurality of different software requirements together into at least one logical group of software requirements based on the sequence for the plurality of different software requirements of the software requirements and the relationships between the plurality of different software requirements; generating test cases based on the at least one logical group of software requirements; executing the software program using the test cases; and analyzing results of execution of the software program using the test cases to identify any defects in the software program.

Example 9 includes the method of Example 8, wherein analyzing the natural language text describing the software requirements to identify the relationships between the plurality of different software requirements of the software requirements includes: generating structured text requirements from unstructured text requirements before analyzing how the data flows between the plurality of different software requirements.

Example 10 includes the method of Example 9, wherein generating the structured text requirements from the unstructured text requirements occurs at least in part using a large language model with the unstructured text requirements as input.

Example 11 includes the method of Example 10, wherein the large language model was trained with a set of training unstructured text requirements and corresponding training structured text requirements.

Example 12 includes the method of any of Examples 8-11, wherein analyzing the natural language text describing the software requirements to identify the relationships between the plurality of different software requirements of the software requirements includes: generating structured text requirements from unstructured text requirements before analyzing how the data flows between the plurality of different software requirements; analyzing how the data flows between the plurality of different software requirements by comparing inputs and outputs of the structured text requirements; and identifying the dependencies between the plurality of different software requirements by comparing the inputs and the outputs of the structured text requirements.

Example 13 includes the method of any of Examples 8-12, wherein generating the test cases based on the at least one logical group of software requirements occurs at least in part using a large language model with the at least one logical group of software requirements as an input.

Example 14 includes the method of any of Examples 8-13, further comprising: using feedback from the results of the execution of the software program using the test cases to improve: (1) analyzing the natural language text describing the software requirements to identify the relationships between the plurality of different software requirements of the software requirements; (2) establishing the sequence for the plurality of different software requirements based on the relationships identified between the plurality of different software requirements of the software requirements; and (3) grouping the plurality of different software requirements together into the at least one logical group of software requirements based on the sequence for the plurality of different software requirements of the software requirements and the relationships between the plurality of different software requirements.

Example 15 includes a non-transitory computer-readable medium including a set of instructions that, when executed by at least one processor, cause the at least one processor to: receive natural language text describing software requirements for a software program; analyze the natural language text describing the software requirements to identify relationships between a plurality of different software requirements of the software requirements at least in part by: analyzing how data flows between the plurality of different software requirements; analyzing how the plurality of different software requirements influence path and decision points to achieve functionality identified by the software requirements; and identifying dependencies between the plurality of different software requirements; establish a sequence for the plurality of different software requirements based on the relationships identified between the plurality of different software requirements of the software requirements; group the plurality of different software requirements together into at least one logical group of software requirements based on the sequence for the plurality of different software requirements of the software requirements and the relationships between the plurality of different software requirements; generate test cases based on the at least one logical group of software requirements; execute the software program using the test cases; and analyze results of execution of the software program using the test cases to identify any defects in the software program.

Example 16 includes the non-transitory computer-readable medium of Example 15, wherein the set of instructions cause the at least one processor to analyze the natural language text describing the software requirements to identify the relationships between the plurality of different software requirements of the software requirements at least in part by: generating structured text requirements from unstructured text requirements before analyzing how the data flows between the plurality of different software requirements.

Example 17 includes the non-transitory computer-readable medium of Example 16, wherein generating the structured text requirements from the unstructured text requirements occurs at least in part using a large language model with the unstructured text requirements as input.

Example 18 includes the non-transitory computer-readable medium of any of Examples 15-17, wherein the set of instructions cause the at least one processor to analyze the natural language text describing the software requirements to identify the relationships between the plurality of different software requirements of the software requirements at least in part by: generating structured text requirements from unstructured text requirements before analyzing how the data flows between the plurality of different software requirements; analyzing how the data flows between the plurality of different software requirements by comparing inputs and outputs of the structured text requirements; and identifying the dependencies between the plurality of different software requirements by comparing the inputs and the outputs of the structured text requirements.

Example 19 includes the non-transitory computer-readable medium of any of Examples 15-18, wherein the set of instructions cause the at least one processor to generate the test cases based on the at least one logical group of software requirements at least in part using a large language model with the at least one logical group of software requirements as an input.

Example 20 includes the non-transitory computer-readable medium of any of Examples 15-19, wherein the set of instructions further cause the at least one processor to: use feedback from the results of the execution of the software program using the test cases to better: (1) analyze the natural language text describing the software requirements to identify the relationships between the plurality of different software requirements of the software requirements; (2) establish the sequence for the plurality of different software requirements based on the relationships identified between the plurality of different software requirements of the software requirements; and (3) group the plurality of different software requirements together into the at least one logical group of software requirements based on the sequence for the plurality of different software requirements of the software requirements and the relationships between the plurality of different software requirements.

What is claimed is:

1. A system, comprising:

at least one processor;

at least one memory communicatively coupled to the at least one processor; and wherein the at least one processor is configured to:

receive unstructured text requirements written in natural language, the unstructured text requirements describing software requirements for a software program, wherein the software requirements are interdependent and sequential, such that data produced by a first software requirement is an input to a second software requirement;

identify relationships between a plurality of different software requirements of the software requirements at least in part by:

generating, using at least one large language model, structured text requirements from the unstructured text requirements;

analyzing how data flows between the plurality of different software requirements by comparing inputs and outputs of the structured text requirements;

analyzing how the plurality of different software requirements influence path and decision points to achieve functionality identified by the software requirements; and identifying dependencies between the plurality of different software requirements by comparing the inputs and the outputs of the structured text requirements;

establish a sequence for the plurality of different software requirements based on the relationships identified between the plurality of different software requirements of the software requirements;

group the plurality of different software requirements together into at least one logical group of software requirements based on the sequence for the plurality of different software requirements of the software requirements and the relationships between the plurality of different software requirements;

generate test cases based on the at least one logical group of software requirements for the sequence for the plurality of different software requirements;

execute the software program using the test cases; and analyze results of execution of the software program using the test cases to identify any defects in the software program.

2. The system of claim 1, wherein the at least one large language model was trained with a set of training unstructured text requirements and corresponding training structured text requirements.

3. The system of claim 1, wherein the at least one processor is configured to generate the test cases based on the at least one logical group of software requirements at least in part using the at least one large language model with the at least one logical group of software requirements as an input.

4. The system of claim 1, wherein the at least one processor is further configured to:

use feedback from the results of the execution of the software program using the test cases to better: (1) identify the relationships between the plurality of different software requirements of the software requirements; (2) establish the sequence for the plurality of different software requirements based on the relationships identified between the plurality of different software requirements of the software requirements; and (3) group the plurality of different software requirements together into the at least one logical group of software requirements based on the sequence for the plurality of different software requirements of the software requirements and the relationships between the plurality of different software requirements.

5. A method, comprising:

receiving unstructured text requirements written in natural language, the unstructured text requirements describing software requirements for a software program, wherein the software requirements are interdependent and sequential, such that data produced by a first software requirement is an input to a second software requirement;

identifying relationships between a plurality of different software requirements of the software requirements at least in part by:

generating, using at least one large language model, structured text requirements from the unstructured text requirements;

analyzing how data flows between the plurality of different software requirements by comparing inputs and outputs of the structured text requirements;

analyzing how the plurality of different software requirements influence path and decision points to achieve functionality identified by the software requirements; and identifying dependencies between the plurality of different software requirements by comparing the inputs and the outputs of the structured text requirements;

establishing a sequence for the plurality of different software requirements based on the relationships identified between the plurality of different software requirements of the software requirements;

grouping the plurality of different software requirements together into at least one logical group of software requirements based on the sequence for the plurality of different software requirements of the software requirements and the relationships between the plurality of different software requirements;

generating test cases based on the at least one logical group of software requirements for the sequence of the plurality of different software requirements;

executing the software program using the test cases; and analyzing results of execution of the software program using the test cases to identify any defects in the software program.

6. The method of claim 5, wherein the at least one large language model was trained with a set of training unstructured text requirements and corresponding training structured text requirements.

7. The method of claim 5, wherein generating the test cases based on the at least one logical group of software requirements occurs at least in part using the at least one large language model with the at least one logical group of software requirements as an input.

8. The method of claim 5, further comprising:

using feedback from the results of the execution of the software program using the test cases to improve: (1) identifying the relationships between the plurality of different software requirements of the software requirements; (2) establishing the sequence for the plurality of different software requirements based on the relationships identified between the plurality of different software requirements of the software requirements; and (3) grouping the plurality of different software requirements together into the at least one logical group of software requirements based on the sequence for the plurality of different software requirements of the software requirements and the relationships between the plurality of different software requirements.

9. A non-transitory computer-readable medium including a set of instructions that, when executed by at least one processor, cause the at least one processor to:

receive unstructured text requirements written in natural language, the unstructured text requirements describing software requirements for a software program, wherein the software requirements are interdependent and sequential, such that data produced by a first software requirement is an input to a second software requirement;

identify relationships between a plurality of different software requirements of the software requirements at least in part by:

generating, using at least one large language model, structured text requirements from the unstructured text requirements;

analyzing how data flows between the plurality of different software requirements by comparing inputs and outputs of the structured text requirements;

analyzing how the plurality of different software requirements influence path and decision points to achieve functionality identified by the software requirements; and identifying dependencies between the plurality of different software requirements by comparing the inputs and the outputs of the structured text requirements;

establish a sequence for the plurality of different software requirements based on the relationships identified between the plurality of different software requirements of the software requirements;

group the plurality of different software requirements together into at least one logical group of software requirements based on the sequence for the plurality of different software requirements of the software requirements and the relationships between the plurality of different software requirements;

generate test cases based on the at least one logical group of software requirements for the sequence for the plurality of different software requirements;

execute the software program using the test cases; and analyze results of execution of the software program using the test cases to identify any defects in the software program.

10. The non-transitory computer-readable medium of claim 9, wherein the set of instructions cause the at least one processor to generate the test cases based on the at least one logical group of software requirements at least in part using the at least one large language model with the at least one logical group of software requirements as an input.

11. The non-transitory computer-readable medium of claim 9, wherein the set of instructions further cause the at least one processor to:

use feedback from the results of the execution of the software program using the test cases to better: (1) identify the relationships between the plurality of different software requirements of the software requirements; (2) establish the sequence for the plurality of different software requirements based on the relationships identified between the plurality of different software requirements of the software requirements; and (3) group the plurality of different software requirements together into the at least one logical group of software requirements based on the sequence for the plurality of different software requirements of the software requirements and the relationships between the plurality of different software requirements.

* * * * *